United States Patent
Thomas et al.

(10) Patent No.: US 9,537,548 B2
(45) Date of Patent: Jan. 3, 2017

(54) RANDOM ACCESS CHANNEL USING BASIS FUNCTIONS

(71) Applicant: NOKIA SOLUTIONS AND NETWORKS OY, Espoo (FI)

(72) Inventors: Timothy Thomas, Palatine, IL (US); Jun Tan, Lake Zurich, IL (US); Frederick Vook, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 136 days.

(21) Appl. No.: 14/524,682

(22) Filed: Oct. 27, 2014

(65) Prior Publication Data
US 2016/0119038 A1  Apr. 28, 2016

(51) Int. Cl.
| H04B 7/04 | (2006.01) |
| H04B 7/08 | (2006.01) |
| H04W 74/08 | (2009.01) |
| H04W 74/00 | (2009.01) |

(52) U.S. Cl.
CPC ............... *H04B 7/043* (2013.01); *H04B 7/088* (2013.01); *H04W 74/004* (2013.01); *H04W 74/0833* (2013.01)

(58) Field of Classification Search
CPC ....... H04B 7/043; H04B 7/088; H04B 1/1027; H04B 7/0695; H04B 7/063; H04B 7/0408; H04B 7/08; H04W 74/004; H04W 74/0833; H04W 16/28
See application file for complete search history.

(56) References Cited

U.S. PATENT DOCUMENTS

| 6,330,459 | B1 | 12/2001 | Chrichton et al. | |
| 6,442,220 | B1 | 8/2002 | Sihlborn | |
| 2009/0046582 | A1 | 2/2009 | Sarkar et al. | |
| 2010/0190450 | A1* | 7/2010 | Stirling-Gallacher | H04B 7/088 455/67.13 |
| 2011/0110453 | A1* | 5/2011 | Prasad | H04B 7/0695 375/285 |
| 2012/0314664 | A1* | 12/2012 | Johansson | H04W 74/0833 370/329 |
| 2012/0320874 | A1 | 12/2012 | Li et al. | |

(Continued)

FOREIGN PATENT DOCUMENTS

| WO | 2014/038321 A1 | 3/2014 |
| WO | 2014/139174 A1 | 9/2014 |

OTHER PUBLICATIONS

International Search Report and Written Opinion application No. PCT/EP2015/073001 issued Jan. 18, 2016.

(Continued)

*Primary Examiner* — Yee Lam
(74) *Attorney, Agent, or Firm* — Squire Patton Boggs (US) LLP

(57) ABSTRACT

Systems, methods, apparatuses, and computer program products for random access channel (RACH) design using basis functions are provided. One method includes receiving, at an access point employing a receiver with Q antennas, a random access channel (RACH) preamble sent from a mobile unit. The receiving may comprise receiving the same RACH preamble at B different time intervals where the access point beamforms with a different beam selected from B basis function beams at each of the different time intervals.

26 Claims, 11 Drawing Sheets

(56) References Cited

U.S. PATENT DOCUMENTS

| | | | |
|---|---|---|---|
| 2013/0102345 A1* | 4/2013 | Jung | H04B 7/0456 |
| | | | 455/513 |
| 2013/0182683 A1 | 7/2013 | Seol et al. | |
| 2013/0301567 A1* | 11/2013 | Jeong | H04W 74/0833 |
| | | | 370/329 |
| 2014/0120926 A1 | 5/2014 | Shin et al. | |
| 2014/0254515 A1 | 9/2014 | Kim et al. | |
| 2015/0222340 A1 | 8/2015 | Nagata et al. | |

OTHER PUBLICATIONS

Office Action U.S. Appl. No. 14/524,726 dated Mar. 8, 2016.
3GPP TR 36.888 V12.0.0 (Jun. 2013); 3rd Generation Partnership Project; Technical Specification Group Radio Access Network; Study on provision of low-cost Machine-Type Communications (MTC) User Equipments (UEs) based on LTE (Release 12).
IEEE Std 802.16e™-2005 and IEEE Std 802.16™-2004/Cor1-2005 (Amendment and Corrigendum to IEEE Std 802.16-2004); Part 16: Air Interface for Fixed and Mobile Broadband Wireless Access Systems; Amendment 2: Physical and Medium Access Control Layers for Combined Fixed and Mobile Operation in Licensed Bands.
IEEE Std 802.16m™-2011 (Amendment to IEEE Std 802.16™-2009); Part 16: Air Interface for Broadband Wireless Access Systems; Amendment 3: Advanced Air Interface.
International Search Report application No. PCT/EP2015/072663 mailed Dec. 23, 2015.

\* cited by examiner

RANDOM ACCESS CHANNEL USING BASIS FUNCTIONS

FIELD

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology. In particular, some embodiments may relate to random access channel (RACH) design for communication systems.

BACKGROUND

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13, LTE Rel-14) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One of the key features of LTE-A is carrier aggregation, which allows for increasing the data rates through aggregation of two or more LTE carriers.

Furthermore, a global bandwidth shortage facing wireless carriers has motivated the consideration of the underutilized millimeter wave (mmWave) frequency spectrum for future broadband cellular communication networks. mmWave (or extremely high frequency) generally refers to the frequency range between 30 and 300 gigahertz (GHz). This is the highest radio frequency band in practical use today. Radio waves in this band have wavelengths from ten to one millimeter, giving it the name millimeter band or millimeter wave.

The amount of wireless data might increase one thousand fold over the next ten years. Essential elements in solving this challenge include obtaining more spectrum, having smaller cell sizes, and using improved technologies enabling more bits/s/Hz. An important element in obtaining more spectrum is to move to higher frequencies, above 6 GHz. For fifth generation wireless systems (5G), an access architecture for deployment of cellular radio equipment employing mmWave radio spectrum has been proposed. In addition to extending cellular service into the mmWave band, dynamic spectrum access is an important technique to improve spectrum utilization.

SUMMARY

One embodiment is directed to a method which may include receiving, at an access point employing a receiver with Q antennas, a random access channel (RACH) preamble sent from a mobile unit. The receiving may comprise receiving the same RACH preamble at a plurality, $M_B$, of different time intervals where the access point beamforms with a different beam selected from B basis function beams at each of the different time intervals.

Another embodiment is directed to an apparatus which may include at least one processor, and at least one memory including computer program code. The at least one memory and computer program code may be configured, with the at least one processor, to cause the apparatus at least to receive a random access channel (RACH) preamble sent from a mobile unit. The apparatus may be configured to receive the same RACH preamble at a plurality, $M_B$, of different time intervals where the apparatus beamforms with a different beam selected from B basis function beams at each of the different time intervals.

Another embodiment may be directed to an apparatus which may include receiving means for receiving a random access channel (RACH) preamble sent from a mobile unit. The receiving means may include means for receiving the same RACH preamble at a plurality, $M_B$, of different time intervals where the apparatus beamforms with a different beam selected from B basis function beams at each of the different time intervals.

Another embodiment is directed to a computer program, embodied on a non-transitory computer readable medium, the computer program may be configured to control a processor to perform a process. The process may include receiving, at an access point employing a receiver with Q antennas, a random access channel (RACH) preamble sent from a mobile unit. The receiving comprises receiving the same RACH preamble at a plurality, $M_B$, of different time intervals where the access point beamforms with a different beam selected from B basis function beams at each of the different time intervals.

Another embodiment is directed to a method which may include sending, by a mobile unit, a random access channel (RACH) preamble. The sending may comprise sending multiple copies of the same RACH preamble at different time intervals where each time interval corresponds to an access point receiver beamforming with a Q-element antenna array employing a different beam from a set of B basis function beams.

Another embodiment is directed to an apparatus which may include at least one processor, and at least one memory including computer program code. The at least one memory and computer program code may be configured, with the at least one processor, to cause the apparatus at least to send a random access channel (RACH) preamble. The sending of the RACH preamble may comprise sending multiple copies of the same RACH preamble at different time intervals where each time interval corresponds to an access point receiver beamforming with a Q-element antenna array employing a different beam from a set of B basis function beams.

Another embodiment is directed to an apparatus which may include sending means for sending a random access channel (RACH) preamble. The sending means may comprise means for sending multiple copies of the same RACH preamble at different time intervals where each time interval corresponds to an access point receiver beamforming with a Q-element antenna array employing a different beam from a set of B basis function beams.

Another embodiment is directed to a computer program, embodied on a non-transitory computer readable medium, the computer program configured to control a processor to perform a process. The process may include sending a random access channel (RACH) preamble. The sending may comprise sending multiple copies of the same RACH preamble at different time intervals where each time interval corresponds to an access point receiver beamforming with a Q-element antenna array employing a different beam from a set of B basis function beams.

BRIEF DESCRIPTION OF THE DRAWINGS

For proper understanding of the invention, reference should be made to the accompanying drawings, wherein.

DETAILED DESCRIPTION

Figure 1:
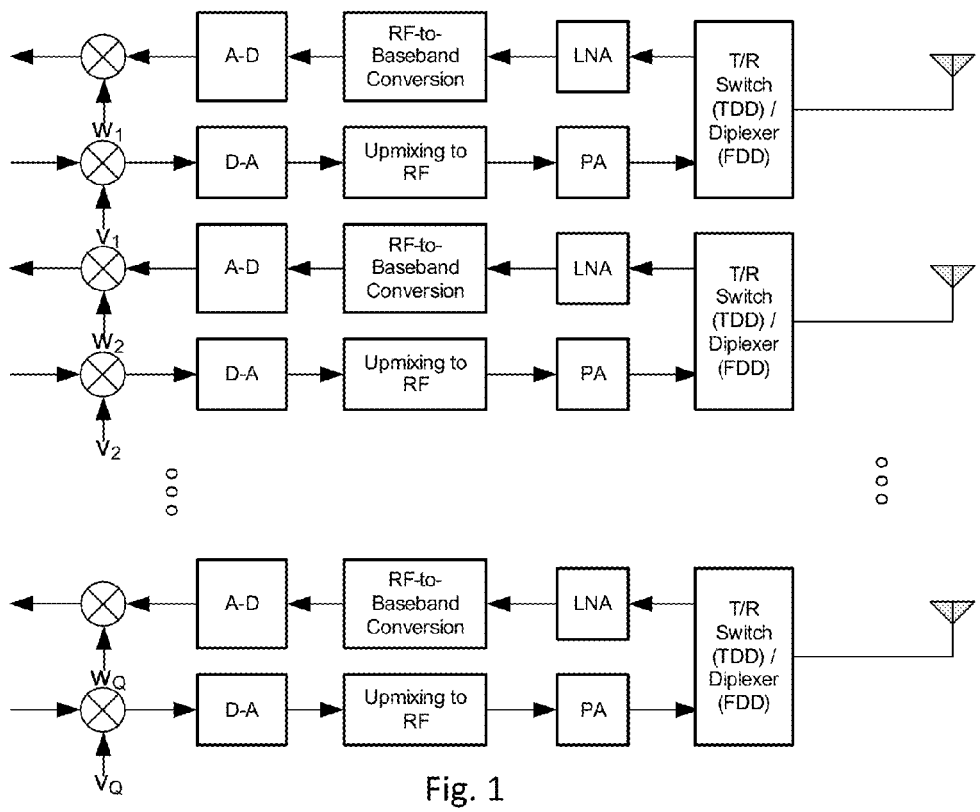
FIG. 1 illustrates an example block diagram of traditional baseband array processing.

It will be readily understood that the components of the invention, as generally described and illustrated in the figures herein, may be arranged and designed in a wide variety of different configurations. Thus, the following detailed description of embodiments of systems, methods, apparatuses, and computer program products for random access channel (RACH) design using basis functions, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to wireless communications and, in particular, may relate to RACH design for mmWave communication systems. One problem that is addressed by certain embodiments is how to transmit the RACH preamble from the mobile device or UE when using receive radio frequency (RF) beamforming and, in particular, RF receive beamforming for mmWave communications at the access point. RF beamforming tends to be very directional in nature and is not well suited for receiving a message from multiple users since the users in a communication system tend to be spread out geographically (e.g., each user is ideally served with its each unique directional RF beam).

The difficulty with array processing at mmWave is that the analog to digital (A-D) converters and digital to analog (D-A) converters consume an unacceptable amount of power because of the large bandwidths of mmWave systems (e.g., bandwidths of 1-2 GHz as opposed to 20 MHz for traditional cellular frequencies). The large power consumption of the D-A and A-D converters means that the number of A-D and D-A converters needs to be minimized in mmWave, and thus the consequence is that traditional array processing at is no longer viable.

FIG. 1 illustrates an example of traditional baseband array processing (Q baseband units for Q total antennas). Wideband beamforming is shown, but the beamforming can also be frequency selective by applying per-subcarrier weights in the frequency domain. The traditional baseband processing means that there is a full transceiver (transmitter/receiver (Tx/Rx) chain) behind each antenna. The baseband beamforming can be wideband as shown (i.e., with a single transmit weight across frequency, $v_1$ through $v_Q$, and a single receive weight, $w_1$ through $w_Q$) or with frequency-selective weights applied at baseband in the frequency domain. At traditional cellular frequencies, the number of antennas/baseband transceivers is typically less than or equal to 8, but at mmWave a larger number of antennas may be needed (e.g., greater than or equal to 16) to overcome the increased path loss at the higher frequencies. Even if full baseband units were practical at the large bandwidths of mmWave systems, there would still be issues in receiving RACH preambles sent by any user in the serving area from all Rx antennas in an omni-directional manner. Some of these issues are how to overcome the loss of not using beamforming and how to aggregate all antennas into a truly omni-directional signal.

Figure 2:
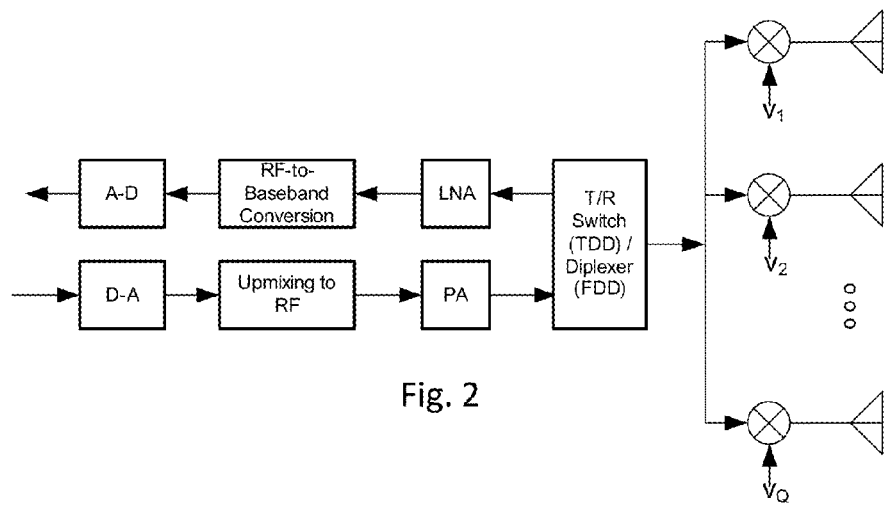
FIG. 2 illustrates an example block diagram of RF beamforming with a single RF beamformer and a single baseband path.
Figure 3:
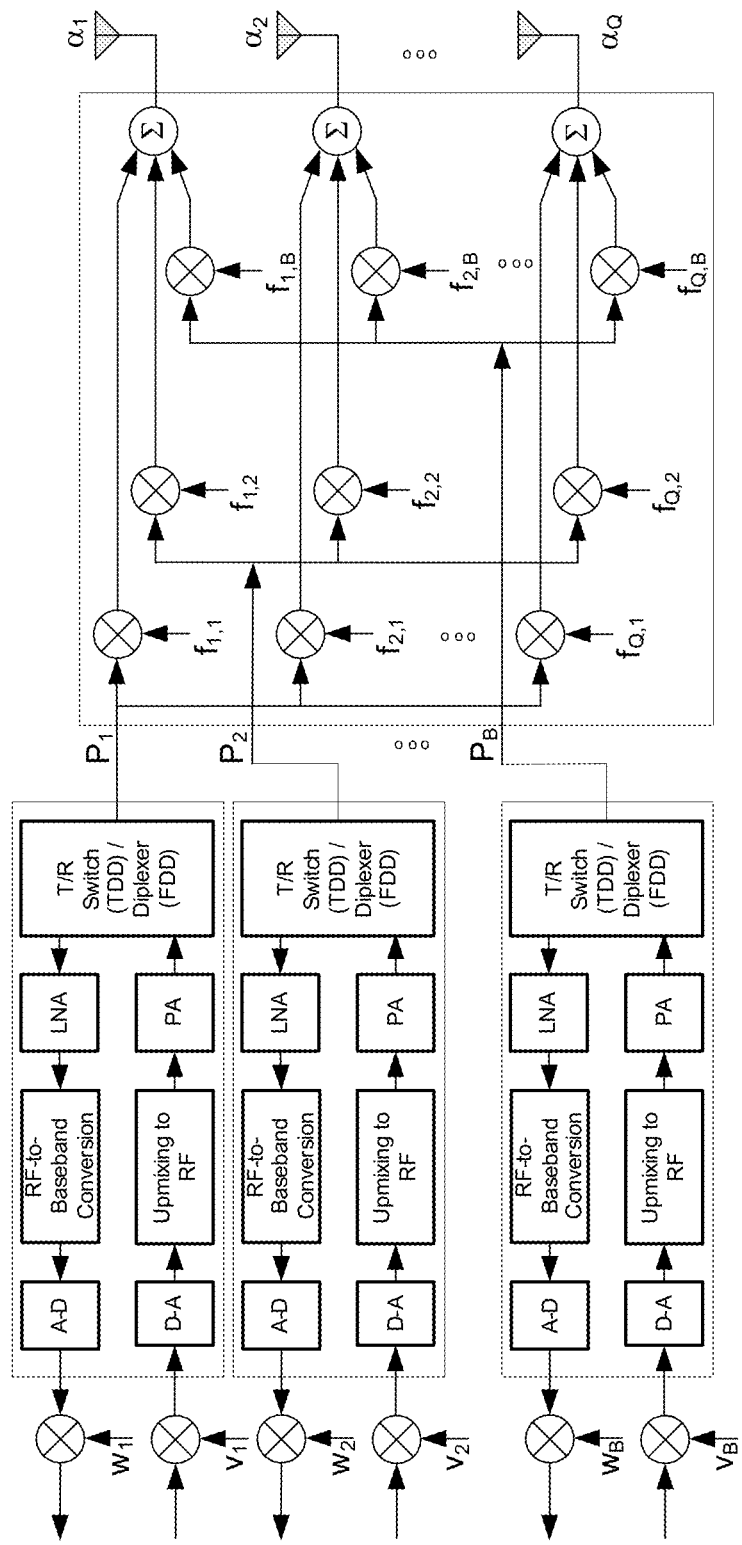
FIG. 3 illustrates an example block diagram of RF beamforming with B RF beamformers and B baseband paths serving Q antennas.

An alternative to there being a baseband unit present behind each antenna element is for there to be a single or a small number of baseband paths that are available for beamforming such as in an RF beamforming array, as illustrated in FIG. 2 (for a single baseband path for all Q elements) and FIG. 3 for a hybrid array (for B baseband paths behind all Q elements where B<<Q). However, using these array architectures means that only a single or a few RF beams can be activated at a given time. Compounding the problem is that the base station will likely not know where to point the Rx beams since users sending the RACH will not yet be registered into the system or will be inactive up to that point.

Figure 4:
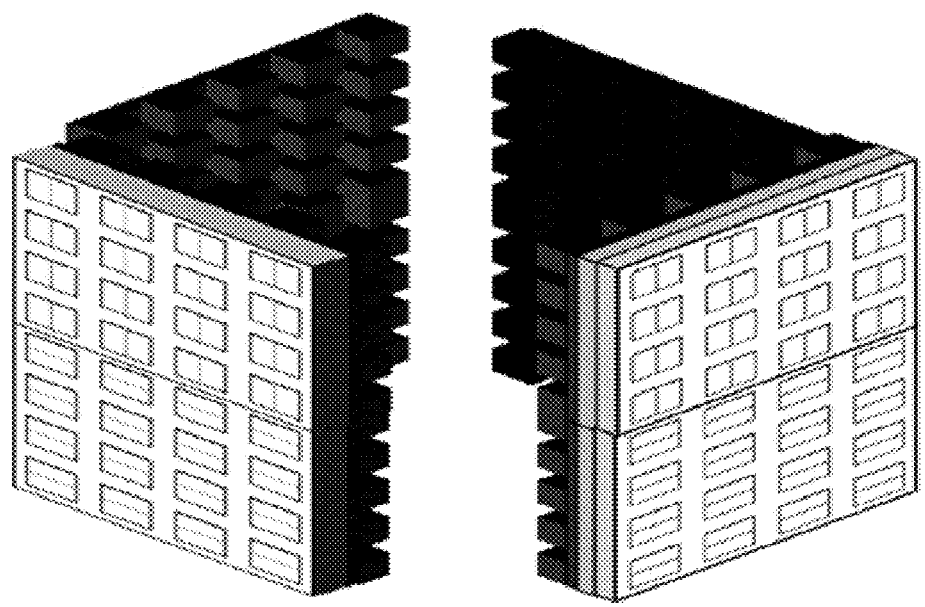
FIG. 4 illustrates an example access point design with four sectors and two arrays per sector with each array having orthogonal polarizations.

Hence while it would be best to receive the RACH preamble from highly-directional RF beams tailored to the mobile transmitting the preamble, the access point will likely be unaware of where to point the RF beam since it will not know which user is transmitting the RACH preamble at a particular time. Further complicating the problem is that there are likely two arrays per sector in an access point, as illustrated in the example of FIG. 4 where the arrays employ orthogonal polarizations relative to each other. In particular, FIG. 4 illustrates an example access point design with four sectors and two 4×4 arrays per sector with each array having orthogonal polarizations (e.g., horizontal (bottom) and vertical (top)).

Since it is desirable to receive the RACH preambles in an omni-directional manner, a method for omni-directional reception of RACH preambles across two arrays with orthogonal polarizations is desired while retaining a large gain to all users sending a RACH preamble to overcome the increased path loss expected at mmWave.

Embodiments may relate to ways of transmitting the RACH preamble (from a UE) when using receive RF beamforming at the base station. Certain embodiments provide a mechanism that will allow a full beam steering gain to be obtained while providing omni-directional coverage for receiving RACH preambles. In an embodiment, a UE may repeat the same RACH preamble at $M_B$ times out of a total of B times during which the base station listens on different orthogonal receive basis function beams (the basis function beam is a receive weight vector or beam) at each of those B times. The base station may listen on the appropriate basis function beams, sum the received signal across all beams, and then run a preamble detection on the summed signal.

In more detail, embodiments provide a feedback mechanism for the RACH which includes information on the "preferred beam" to use in the downlink direction. This preferred beam information may, according to an embodiment, be estimated by the UE based on beam-specific pilot symbols (which could bring savings compared to "exhaustive search approaches" which would alternatively be needed for mmWave systems). The beam-specific pilots may be transmitted at the same time on different beams provided that they have sufficient orthogonality, or they may be transmitted in a time-interleaved fashion to ensure orthogonality. In the feedback approach, embodiments may provide a near-omni-direction reception beam, which will allow the Access Point (AP) or base station to receive the RACH request from any direction.

According to an embodiment, during a RACH interval, a mobile device repeats a RACH preamble $M_B$ times, where at each time the mobile device multiplies the RACH preamble by a weight calculated for the particular beam the base station will receive with at the given time. In an embodiment, the weight may be a phase value. In certain embodiments, the mobile device may send each RACH preamble at a time interval where it is known that the access point is listening with the same basis function beam (i.e., RF receive beam) with which the weight was determined. The weights (e.g., phase values) may be determined by the mobile device from pilot signals sent by the base station from different basis function beams. Also, $M_B$ may be determined as the $M_B$ basis function beams whose pilot signals were received by the mobile device with the highest power (or, alternatively, $M_B$ could be all basis function beams).

In an embodiment, the access point listens on omni-directional basis function beams instead of directional basis function beams so that the signal from the mobile device can be better combined across the different receive basis functions. In addition, certain embodiments provide for the reception of the RACH preambles across two or more RF arrays in each sector at an access point and coordinating the basis function beam reception across the two or more RF arrays.

Embodiments of the invention provide an approach for the mobile device to transmit a RACH preamble to an access point with a single RF array or a pair of RF arrays (e.g., with orthogonal polarization as illustrated in FIG. 4). Some of the possible transmitter (Tx) and receiver (Rx) configurations are depicted in FIGS. 2-4, but the following description will concentrate on the access point Rx having the configuration shown in FIG. 2 and FIG. 4 with a single Rx weight vector per array in each sector. For illustration purposes, it is assumed that the Rx array is an M×M array ($M^2$ total antennas) where the array has a uniform spacing of antennas in each dimension (e.g., 0.5 wavelength spacing). However, embodiments of the invention can also easily be applied to one-dimensional arrays and arbitrary 2D arrays as well.

One embodiment is for the mobile device to repeat the same RACH preamble at $M_B$ times out of a total of $B=M^2$ times where the access point listens on different orthogonal receive basis function beams (where a basis function beam can be viewed as a receive weight vector or beam where any weight vector in the set is preferably orthogonal to all other beams in the set) at each of those $M^2$ times. In addition, according to an embodiment, the mobile device weights each of the RACH transmissions with a phase only or a gain and phase (weight) value associated with each of the $M_B$ basis function beams. The mobile device may first need to determine which $M_B$ times (i.e., which basis functions are the strongest, i.e., most dominant, ones) to transmit the RACH.

Thus, at some time before the RACH uplink interval, the access point may sound each of the $B=M^2$ basis function beams by sending pilot symbols from each of the $M^2$ basis function beams in some manner. This sounding may be part of some other downlink messaging, such as the synchronization channel or the broadcast control channel. The access point receiver will combine the RACH preambles received from all of the basis function beams by summing the signal received on each time the different basis function beams are active.

Embodiments consider two types of basis function beams for use. The first option is using highly-directional beams where it is likely that the mobile device would only see a few dominant basis function beams (i.e., $M_B$ is small). The second option is using near-omni-directional basis function beams where the mobile device will likely see each beam as being equally good. For a two dimensional array with M antennas in each dimension (e.g., azimuth and elevation), highly-directional basis function beams are first chosen for each dimension, and then the set of overall basis function beams is formed as the Kronecker combination of the basis function beams for the azimuth and elevation dimensions. For example, the basis function beams in one dimension (i.e., azimuth or elevation) can be chosen from a sampling of the DFT matrix V whose $(n,m)^{th}$ element is given by:

$$V_{nm}(M) = \exp\left\{-j\frac{2\pi}{M}(n-1)(m-1)\right\}$$

where $1 \leq n \leq M$ and $1 \leq m \leq M$. Referring back to FIG. 2 (with Q in the figure equal to $M^2$) the transmit weights ($v_1$ through $V_Q$) for one of the basis function beams would then be the Kronecker product of two of the columns of V (one column for elevation and one column for azimuth). In equation form let $z_n$ refer to column n of V:

$$z_n = \begin{bmatrix} V_{1n} \\ \vdots \\ V_{Mn} \end{bmatrix},$$

then the set of $M^2$ highly-directional basis function beams or transmit weight vectors (where each weight vector is $M^2 \times 1$) is defined by ($1 \leq n \leq M$ and $1 \leq m \leq M$):

$$v_{n+M(m-1)} = \begin{bmatrix} V_{1m}z_n \\ V_{2m}z_n \\ \vdots \\ V_{Mm}z_n \end{bmatrix}.$$

Figure 5A:
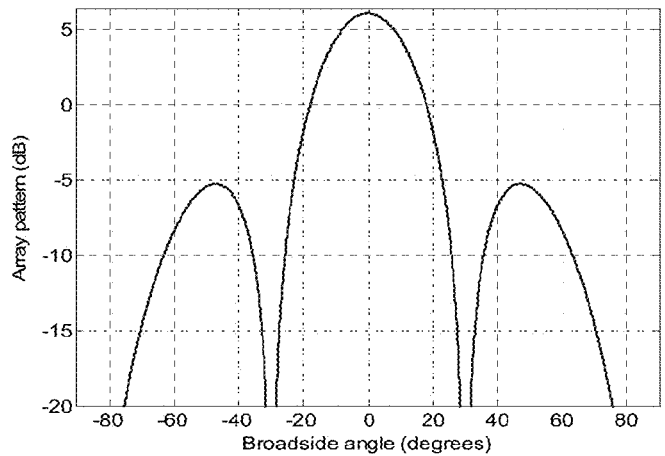
FIG. 5a illustrates a graph depicting an antenna beam pattern, according to an embodiment.
Figure 5B:
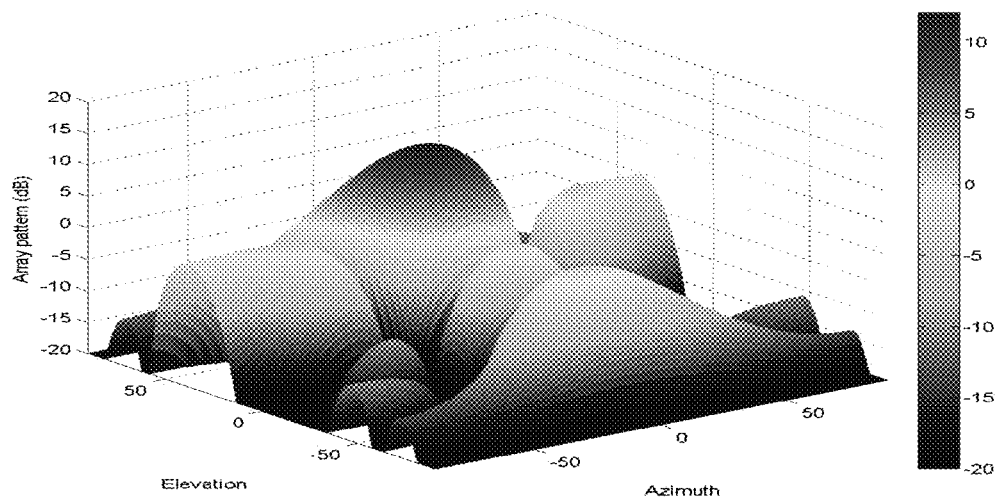
FIG. 5b illustrates a graph depicting an antenna beam pattern, according to an embodiment.
Figure 5C:
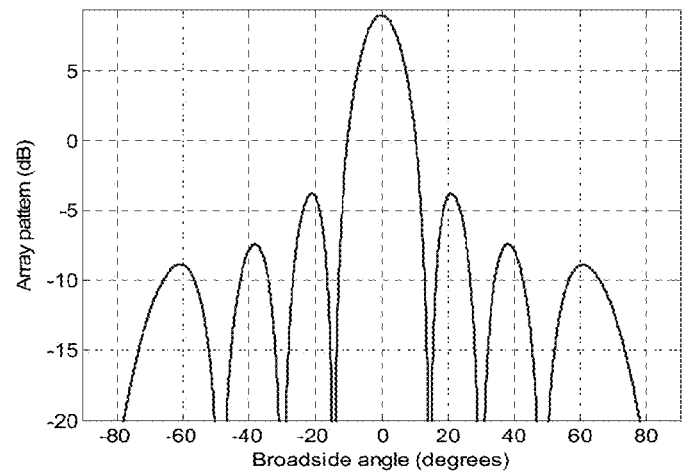
FIG. 5c illustrates a graph depicting an antenna beam pattern, according to an embodiment.
Figure 5D:
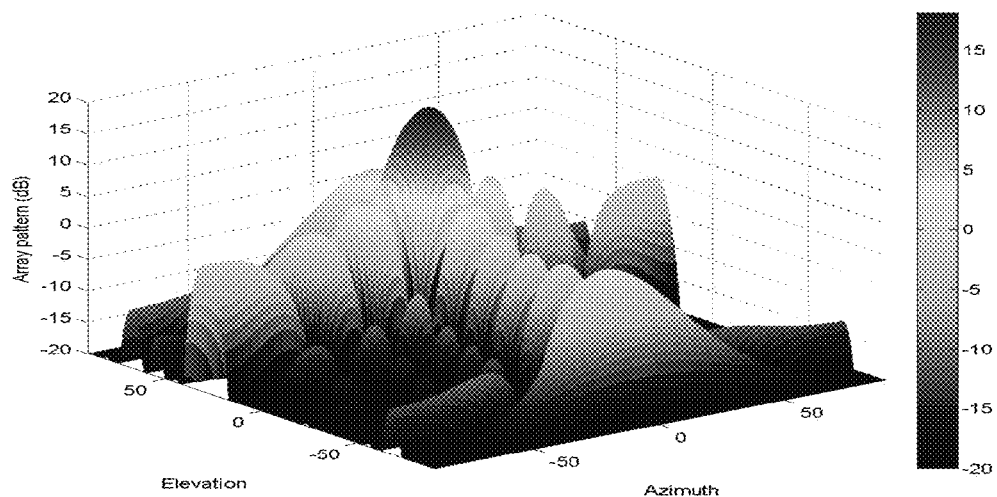
FIG. 5d illustrates a graph depicting an antenna beam pattern, according to an embodiment.

When used at the receiver of an access point, the highly-directional beams will listen to specific directions. Example plots of a highly-direction beam for M=4 and M=8 with half-wavelength antenna spacings are depicted in FIGS. 5a-5d. The plots on the graphs of FIGS. 5a and 5c show the antenna beam pattern in one dimensional (azimuth or elevation) produced by the M×1 beam, $z_n$. The plots on the graphs of FIGS. 5b and 5d show the resulting antenna beam pattern in both azimuth and elevation dimension when the beam of FIGS. 5a and 5c, respectively, are used in the Kronecker product with another beam, $z_m$. FIGS. 5a and 5b are for M=4, and FIGS. 5c and 5d are for M=8. This example is just one basis function beam, other basis function beams will point in different directions thus covering the full space in azimuth and elevation. It is noted that when using one of these basis function beams to listen to a signal from a mobile device that it will favor certain directions over others by a wide range (e.g., more than a 30 dB difference between the maximum and minimum directions). Employing highly-directional basis function beams when listening to the RACH preambles may have certain disadvantages over near-omni-directional basis functions as will be described later.

To overcome the disadvantages of using highly-directional basis function beams, near-omni-directional basis function beams can be constructed. In order to construct the near-omni-directional basis function beams, a near-omni-directional beam is first created for one dimension (either azimuth or elevation). The construction can be done in any way known in the art, such as by a gradient search which minimizes the peaks while maximizing the minimums of the antenna pattern while forcing the elements of the weight vector to be constant modulus. The constant modulus property is important in RF beamforming so that full energy is received on all receive antennas instead of attenuated power on some receive antennas, which will result in a degradation of the SNR after receive combining at RF. Through the gradient search two single-dimension near-omni directional beams are given by:

$$f = \frac{1}{2}\begin{bmatrix} 1 \\ \exp(-j1.9433) \\ \exp(-j0.7348) \\ \exp(j0.4568) \end{bmatrix} \text{ and } f = \frac{1}{\sqrt{8}}\begin{bmatrix} 1 \\ \exp(-j0.175) \\ \exp(j1.5892) \\ \exp(j1.82) \\ \exp(j0.6156) \\ \exp(-j0.6306) \\ \exp(j2.102) \\ \exp(-j1.3168) \end{bmatrix}$$

for M = 4 and M = 8 respectively.

Figure 6A:
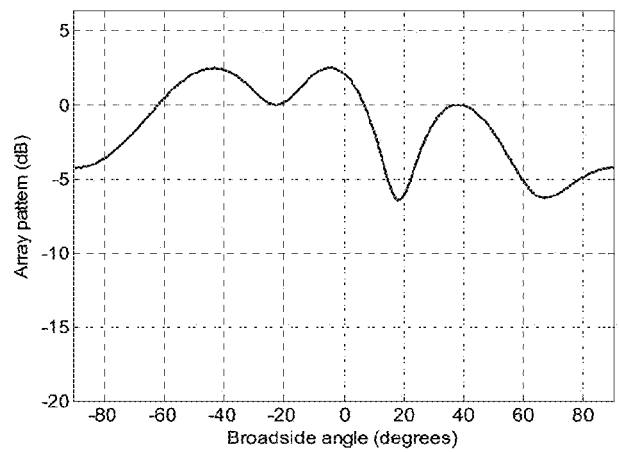
FIG. 6a illustrates a graph depicting antenna patterns for near-omni-directional beams, according to an embodiment.
Figure 6B:
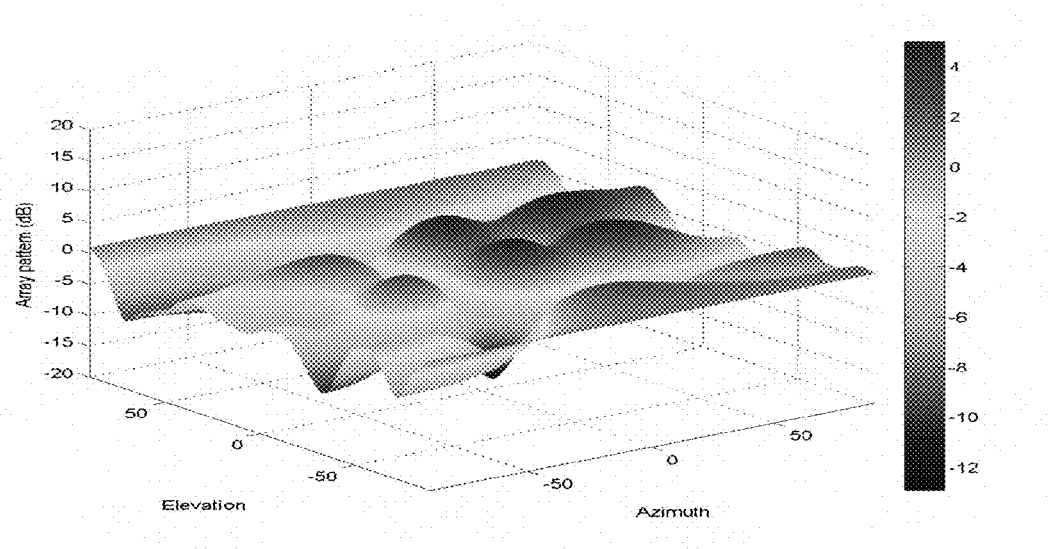
FIG. 6b illustrates a graph depicting antenna patterns for near-omni-directional beams, according to another embodiment.
Figure 6C:
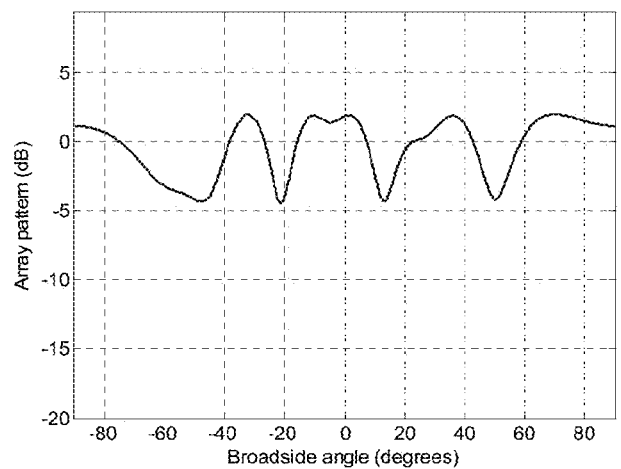
FIG. 6c illustrates a graph depicting antenna patterns for near-omni-directional beams, according to another embodiment.
Figure 6D:
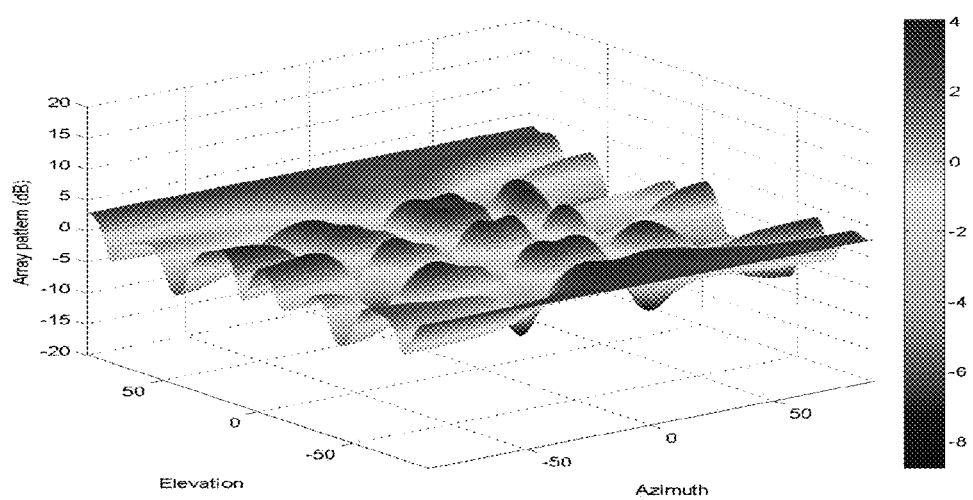
FIG. 6d illustrates a graph depicting antenna patterns for near-omni-directional beams, according to another embodiment.

The resulting antenna patterns for these near-omni-directional beams are shown in the plots on the graphs of FIGS. 6a and 6c. It is noted that the deviation between the maximum gain and minimum gain is very small compared to the highly-directional beams. In order to obtain a near-omni-directional beam for the M×M array, a Kronecker product of the two beams can be used and the resulting beam pattern is shown in the plots on the graphs of FIGS. 6b and 6d. FIGS. 6a and 6b are for M=4, and FIGS. 6c and 6d are for M=8.

It should be noted that, to obtain the beams for the M×M array, the Kronecker product was performed using the above weight, f, and another weight which is f shifted by 30 degrees (i.e., f is element-wise multiplied by an array manifold vector for 30 degrees. This 30 degree shift is just one example, other shifts could also be used.) To get a full set of near-omni-directional basis function beams (i.e., a set of $M^2$ beams which are all orthogonal to one another), the resulting near-omni-directional beam obtained for the M×M array can be element-wise multiplied by the set of highly-directional basis function beams obtained above. The element-wise multiplication with the highly-directional beams shifts the near-omni-directional pattern in the direction of the maximal gain of the highly-directional beams while retaining the near-omni-directional pattern shown in FIG. 6. Using the near-omni-directional basis function beams will be beneficial for receiving a RACH preamble, as will be discussed below.

Figure 7:
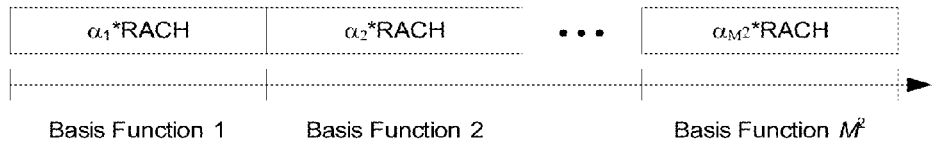
FIG. 7 illustrates an example of basis function reception of the RACH preambles.

In one embodiment, the access point listens on each basis function beam at a different time and the mobile device sends its RACH preamble at the times associated with the dominant $M_B$ basis function beams. In addition, during the time the access point listens with beam b, the mobile device may use the RACH preamble with the phase (or gain and phase) associated with that beam. In other words, the mobile device may multiply the RACH preamble by $\alpha_b$ as is illustrated in the example of FIG. 7. When the weight is phase only, $\alpha_b$ will be of the form $\exp(j\beta_b)$ where $\beta_b$ is the phase value. This is what is meant by multiplying the RACH preamble with a phase value. In particular, FIG. 7 illustrates an example of basis function reception of the RACH preambles sent from the mobile device where the access point listens at the given time with the basis function beam shown. The access point may then sum up the contribution from all beams and hence can coherently combine the multiple RACH preambles sent from each mobile device. Then, the access point only needs to detect a RACH preamble from one combined signal as opposed to running the detection algorithm multiple times (one for each beam) as would be required by the grid of beams method. The grid of beams method is where the access point listens on a dense set (much more than $M^2$ beams) of highly-directional beams and the mobile only transmits one RACH preamble during the time that the access point is listening on the best beam for that mobile. In this grid of beams case the base has to run the RACH preamble detection for every beam in the set.

Figure 8:
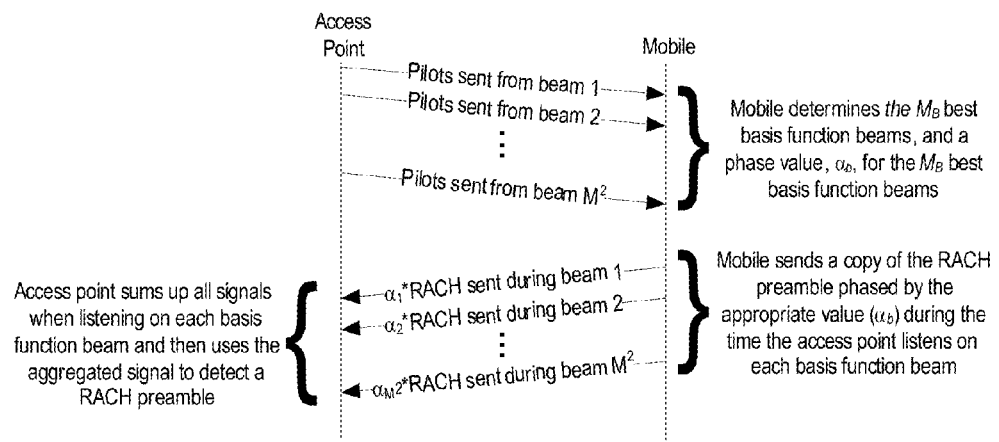
FIG. 8 illustrates a signaling diagram of a method, according to one embodiment.

FIG. 8 illustrates a signaling diagram of a method, according to one embodiment. In this case, a B=M×M array (M antennas in azimuth and M antennas in elevation) is assumed but any array of B antennas may be used. First, the access point sends training (pilots) from each of the basis function beams. This training could be part of another message, such as broadcast control (BCH) or the synchronization channel. The mobile device receives the training from each of the basis function beams and determines a phase (or a gain and phase), $\alpha_b$, for the dominant (e.g., strongest) $M_B$ beams. Note that $\alpha_b$ is non-zero for the dominant $M_B$ beams and is zero for the remaining $M^2-M_B$ beams. Thus, some of the phase values, $\alpha_b$, can be zero if $M_B<M^2$ and in this case the mobile may simply not transmit anything for the time $\alpha_b$ is zero. The mobile device then sends the RACH preamble, phased by the respective value, $\alpha_b$, during the time that the access point is listening on the respective dominant $M_B$ beams. The access point sums the signal received when it is listening on each of the basis function beams to create an aggregated RACH signal. The access point detects the presence of a RACH preamble from the aggregated RACH signal.

When the mobile device transmits its RACH preamble at the $M_B$ times it may transmit the RACH in a beamformed fashion from its own antenna array. The beamforming weights could be determined by listening to signals from the access point received at some point prior to the RACH interval. In addition, if the mobile has two transmit arrays with orthogonal polarizations, the mobile may transmit the RACH preambles using space-time coding across the two arrays.

As discussed in the following, a few issues may need to be taken into account. For example, the mobile device has a maximum transmit power and, in mmWave with high bandwidths, the mobile device will most likely be sending a RACH preamble at this level. This means that power will be lost if $\alpha_b$ is non-equal gain (i.e., not phase only) because transmit power at one time (i.e., during a time the access point is listening with one basis function beam) cannot be transferred to another time (i.e., during a time the access point is listening with a different basis function beam). Also, the access point does not know which basis function beams the mobile device selected, so it will have to sum all signals received on each basis function beam together. Thus, not only is signal energy added together, so is the noise (albeit incoherently). Additionally, using highly-directional basis function beams means that only a few beams will be dominant at the mobile (e.g., $M_B<<M^2$, perhaps as low as 2 or 3). Hence, when the access point adds up the signals on the different RACH preambles, most will only contain noise and therefore the noise will be enhanced.

For example, assuming a 4×4 array (i.e., M=4), the aggregated RACH signal at the access point is given by:

$$y(n) = \sum_{u=1}^{N_u} \sum_{t=1}^{16} [\alpha_t^u v_t^T h_u x_u(n) + n_t(n)],$$

where $N_u$ is the number of mobiles sending RACH preambles at the same time, $\alpha_t^u$ is the phase value for basis function beam t for mobile u, $v_t$ is the $M^2 \times 1$ basis function beam used during RACH interval t, $h_u$ is the $M^2 \times 1$ channel from mobile u, $x_u(n)$ is the RACH preamble from mobile u, and $n_t(n)$ is additive noise with power of $\sigma^2$. Note that $h_u$ may include any transmit beamforming used at the mobile device. The RACH preambles from the different users could be different spreading codes or different sequences (such as generalized chirp-like (GCL) sequences) that have good auto correlations and good cross correlations. The access point would just then correlate with all possible preambles to detect the presence of a RACH signal from a mobile.

A goal is to create an aggregated RACH signal which has a similar signal-to-noise ratio (SNR) to a signal received on an optimal receive beam, which, for a single-ray channel, is given by:

$$SNR_{OPT} = \frac{M^2}{\sigma^2} = \frac{16}{\sigma^2} \text{ for } M = 4.$$

Assuming a single user is sending the RACH preamble (i.e., $N_u=1$) and that $E[|x(n)|2]=1$, the SNR for the aggregated RACH signal is given by:

$$SNR = \frac{\left|\sum_{t=1}^{16} \alpha_t v_t^T h_1\right|^2}{16\sigma^2}.$$

Assuming without loss of generality, for example, that the mobile has maximum transmit power of 1. Therefore, to obtain the highest SNR, $\alpha_t$ should have unit power (i.e., $\alpha_t=\exp(j*\beta_t)$) and the number of dominant basis function beams, $M_B$, needs to be equal to $M^2$ (16 in this case) so that there are no zero-valued phase values. With highly-directional beams this criterion may not be met since there will only be a few (e.g., 2-3) dominant beams, and thus a significant SNR loss will occur. With near-omni-directional basis function beams, at any given mobile location, each beam will have very similar receive power and hence most or all basis functions will be important and the power received on each beam will be roughly equal. In other words, for near-omni-directional beams, $|v_t^T h_u|^2 \approx 1$ for all t and hence the aggregated RACH signal will approach the optimal SNR of $M^2/\sigma^2$ ($16/\sigma^2$ in the example) since $\beta_t$ will be chosen as the negative of the phase of $v_t^T h_u$ when the weight is calculated.

In addition, it is noted that the gain and phase values for the dominant $M_B$ beams may be fed back to the access point so that the base station could determine the optimal RF beamformer to use with that mobile device. In an embodiment, this feedback may be part of the RACH preamble itself.

In order to handle two arrays per sector each with orthogonal polarizations, the basis function beams used can be expanded to include polarization. In this option basis function beams which span the $2M^2$ antennas (e.g., all 32 antennas in each sector of FIG. 4) can be created. The basis function beams in this case could simply be the Kronecker product of the basis function beams for a single array (e.g., as given above for DFT vectors) with:

$$\sqrt{0.5}\begin{bmatrix} 1 & 1 \\ 1 & -1 \end{bmatrix}.$$

An alternative that could be used is:

$$\sqrt{0.5}\begin{bmatrix} 1 & 1 \\ j & -j \end{bmatrix}.$$

Another option for two arrays per sector is to receive on the same basis function beams on both arrays and then combine the received RACH signal across the two arrays. However, this approach assumes that each array is calibrated well enough to see similar antenna patterns with the same basis function beams.

In other embodiments, if the mobile device has two transmit arrays (e.g., each with an orthogonal polarization), then it could beamform the RACH preamble across the two arrays. In yet another example embodiment, the total number of basis function beams, B, can be less than $M^2$ if some scanning angles of the basis function beams are out of the sector coverage (e.g., greater than some angle in azimuth or elevation).

According to another embodiment, the RACH period may be broken up into two intervals for helping with the case of having two arrays at the access point per sector where each array has a different polarization. The mobile device may determine (from a downlink pilot transmission) the same best basis function beams and phase values for $M_B$ basis function beams for both polarizations plus a co-phasing value across the two arrays (chosen to enable coherent combining across the two arrays). The co-phasing may be used to determine if it is better to add a signal received on each of the arrays or if it is better to subtract the signals received on the two arrays. If adding is better, then the mobile device would transmit its RACH preamble using the phase values for the $M_B$ basis function beams during the first time interval where the access point will listen on the same basis function beams on both arrays and then sum the signal across the two arrays. If subtracting is better, then the mobile would transmit its RACH preamble using the phase values for the $M_B$ basis function beams during the second time interval where the access point will listen on the same basis function beams on both arrays and then subtract the signal across the two arrays. In this case, the base station would run the preamble detection twice, first on the signal added across beams in the first time interval and added across the two arrays, and the second on the signal added across beams and subtracted across arrays in the second time interval.

In the following, simulation results are presented that compare the basis function method with the grid of beam method where the mobile detects the strongest beam and then sends its RACH preamble only during the time that the access point listens with that same beam. For the grid of beams approach, a dense set of $4M^2$ beams are employed and for the RACH basis function beam method, $M^2$ basis function beams are used. A null cyclic prefix single carrier (NCP-SC) communication system is assumed with 512 symbols in a data block (i.e., the RACH preamble is 512 symbols long). Hence for the grid of beams approach, four times the resources are needed for the RACH preamble reception (i.e., a group of 512 RACH symbols are needed for each of the $4M^2$ beams). The RACH sequences themselves are comprised of a set of 128 different GCL sequences of length 512 where mobile devices can choose which sequence out of the 128 to transmit the RACH preamble with. In the simulations with multiple mobiles sending RACH preambles at the same time, different sequences are always used for each user. A 72 GHz carrier frequency is assumed with a 2.0 GHz bandwidth and a root-raised cosine pulse with rolloff factor of 0.25 is employed. The access point has one 4×4 array in each sector (four total sectors) with vertical polarization and the mobile has a single 2×2 array with vertical polarization. The simulated channel is a line-of-sight mmWave urban-micro channel.

Figure 9:
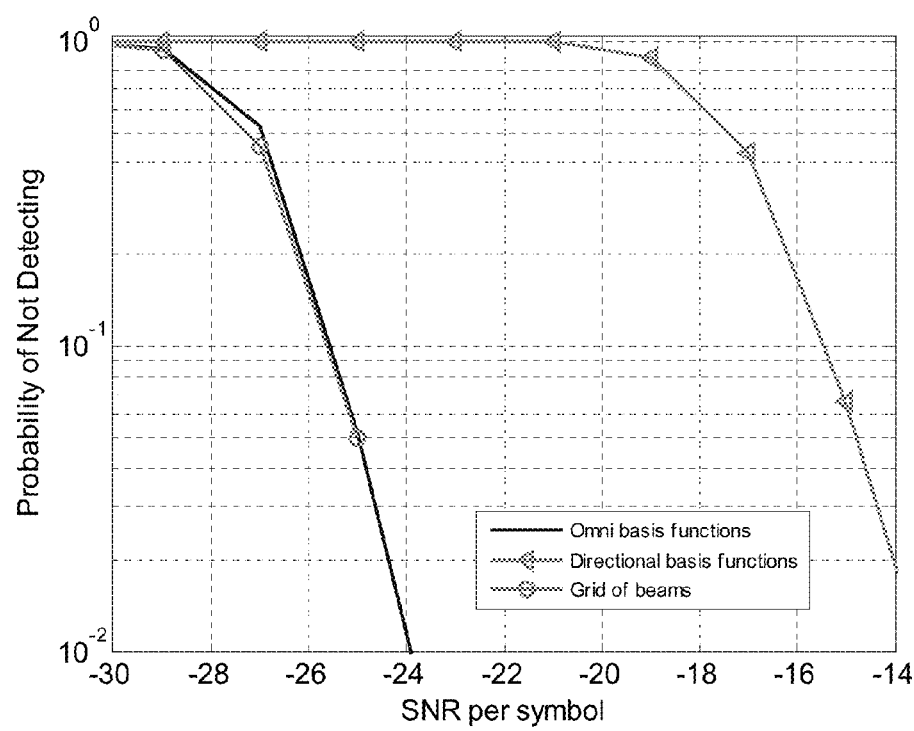
FIG. 9 illustrates the probability of not detecting a RACH preamble from a user, according to an embodiment.

FIG. 9 illustrates the probability of not detecting a RACH preamble from a user when two users are sending their RACH preamble during the same RACH interval. As can be seen from FIG. 9, the near-omni-directional basis function beams produce a similar RACH detection probability as the grid of beams approach despite 1) the grid of beams approach needing four times the number of resources for receiving the RACH preamble, and 2) the access point needing significantly higher computation complexity to process the RACH interval for the grid of beams approach since it needs to search for RACH preambles during each time it receives with one of the beams from the grid of beams (the basis function beam approach sums all signals received from each beam and hence only needs to detect RACH preambles for a single signal).

In view of the above, embodiments of the invention are able to obtain the full RF beam steering gain while providing omni-directional coverage for receiving RACH preambles. This gain is obtained by using near-omni-directional basis function beams and having the mobile device transmit the same RACH preamble during each interval the access point listens with a given basis function beam. The mobile device transmits the RACH preamble during each basis function beam interval multiplied by a phase value calculated for that beam.

Embodiments of the invention provide several advantages. Some advantages include greatly reducing the computational complexity of RACH processing by detecting a RACH preamble in a single signal instead of needing to detect a RACH preamble from many signals received on different beams (e.g., $4M^2$ beams in the grid of beams approach). In addition, embodiments require less resources to send the RACH preambles since the full beamforming gain can be achieved with only $M^2$ time resources instead of $4M^2$ time resources needed for the grid of beams approach. Also, embodiments extend to multiple arrays per sector (possibly with each array having orthogonal polarizations) at the access point or multiple polarizations at the mobile device.

Figure 10A:
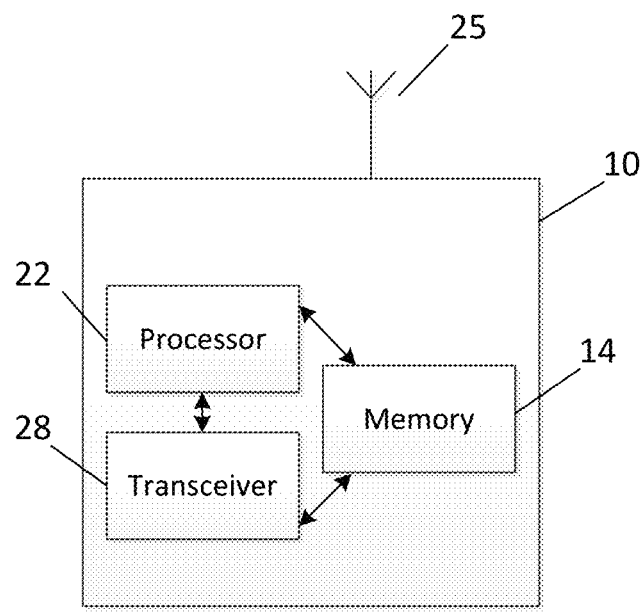
FIG. 10a illustrates an example block diagram of an apparatus, according to one embodiment.

FIG. 10a illustrates an example of an apparatus 10 according to an embodiment. In an embodiment, apparatus 10 may be a node, host, or server in a communications network or serving such a network, such as an access point or base station. It should be noted that one of ordinary skill in the art would understand that apparatus 10 may include components or features not shown in FIG. 10a.

As illustrated in FIG. 10a, apparatus 10 includes a processor 22 for processing information and executing instructions or operations. Processor 22 may be any type of general or specific purpose processor. While a single processor 22 is shown in FIG. 10a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be an access point or base station, for example. In this embodiment, apparatus 10 may be controlled by memory 14 and processor 22 to receive a random access channel (RACH) preamble sent from a mobile unit. More specifically, in one embodiment, apparatus 10 may be controlled by memory 14 and processor 22 to receive the same RACH preamble at B different time intervals where the apparatus 10 beamforms with a different beam selected from B basis function beams at each of the different time intervals. According to an embodiment, the apparatus 10 may be an access point employing a receiver with Q antennas.

In certain embodiments, the RACH preamble in a given time interval is multiplied at the mobile unit by a phase value associated with the basis function beam used to receive at said given time interval. The basis function beams may be orthogonal, according to some embodiments.

According to an embodiment, apparatus 10 may be controlled by memory 14 and processor 22 to send pilot symbols from each of the B basis function beams at some time prior to the RACH interval. In one embodiment, apparatus 10 may be controlled by memory 14 and processor 22 to receive a feedback message from the mobile unit, the feedback message comprising an indication of the best $M_B$ basis function beams plus a gain and phase value for each of the $M_B$ beams.

In certain embodiments, the B orthogonal basis functions are derived from a discrete Fourier transform (DFT) matrix. There may be two sets of Q transmit antennas and RACH preambles that are combined across the two sets of antennas, according to an embodiment.

Figure 10B:
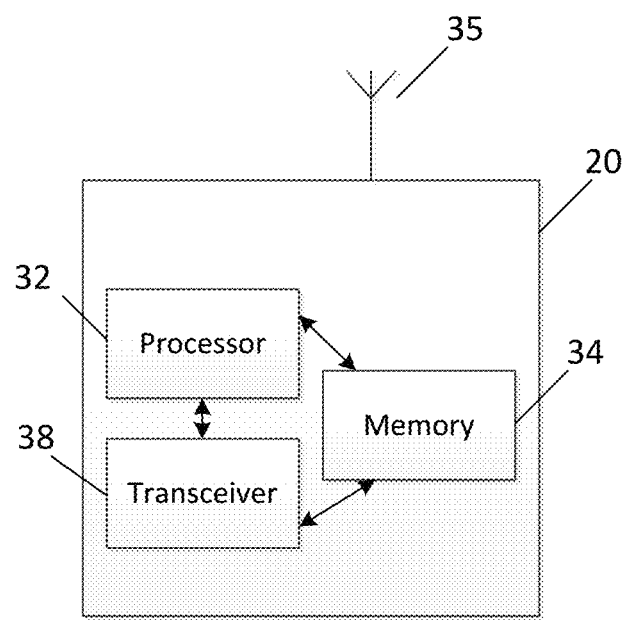
FIG. 10b illustrates an example block diagram of an apparatus, according to another embodiment.

FIG. 10b illustrates an example of an apparatus 20 according to another embodiment. In an embodiment, apparatus 20 may be a node or element in a communications network or associated with such a network, such as mobile device, mobile unit, or UE. It should be noted that one of ordinary skill in the art would understand that apparatus 20 may include components or features not shown in FIG. 10b.

As illustrated in FIG. 10b, apparatus 20 includes a processor 32 for processing information and executing instructions or operations. Processor 32 may be any type of general or specific purpose processor. While a single processor 32 is shown in FIG. 10b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile unit or mobile device, such as UE in LTE or LTE-A. In this embodiment, apparatus 20 may be controlled by memory 34 and processor 32 to send a random access channel (RACH) preamble. More specifically, in an embodiment, apparatus 20 may be controlled to send multiple copies of the RACH preamble at different time intervals where each time interval corresponds to an access point receiver beamforming with a Q-element antenna array employing a different beam from a set of B basis function beams.

In one embodiment, the RACH preamble in a given time interval may also be multiplied by a phase value associated with the basis function beam used to receive at said given time interval. In some embodiments, the basis function beams may be orthogonal.

According to an embodiment, the phase values may be determined from pilot symbols sent by the access point from each of the B basis function beams at some time prior to the RACH interval. In some embodiments, apparatus 20 may be controlled by memory 34 and processor 32 to transmit a feedback message comprising an indication of the best $M_B$ basis function beams plus a gain and phase value for each of the $M_B$ beams. The B orthogonal basis functions may be derived from a discrete Fourier transform (DFT) matrix, for example.

Figure 11A:
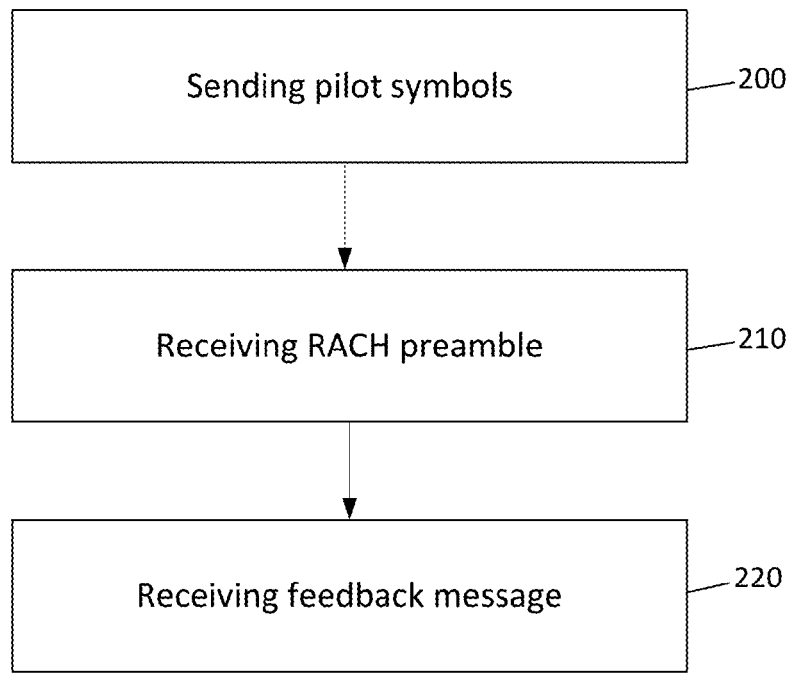
FIG. 11a illustrates an example flow diagram of a method, according to one embodiment.

FIG. 11a illustrates a flow diagram of a method, according to one embodiment. In one embodiment, the method of FIG. 11a may be performed by an access point, for example, employing a receiver with Q antennas. As illustrated in FIG. 11a, the method may include, at 200, sending pilot symbols from each of B basis function beams at some time prior to the RACH interval. The method may also include, at 210, receiving a random access channel (RACH) preamble sent from a mobile unit. The receiving may include receiving the same RACH preamble at B different time intervals where the access point beamforms with a different beam selected from the B basis function beams at each of the different time intervals. The method may further include, at 220, receiving a feedback message from the mobile unit. The feedback message may include an indication of the best $M_B$ basis function beams plus a gain and phase value for each of the $M_B$ beams.

Figure 11B:
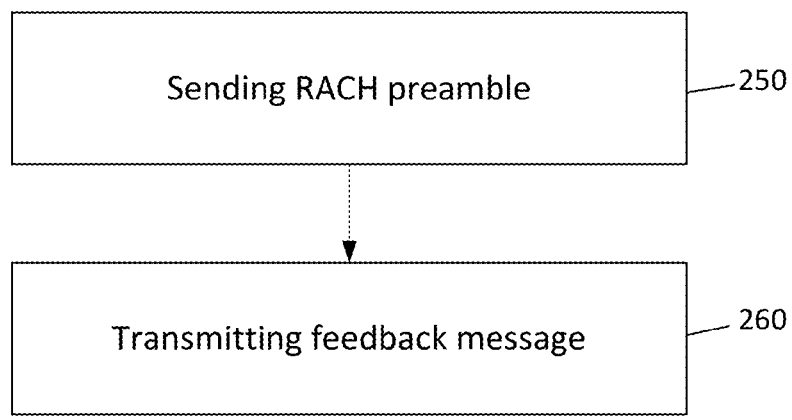
FIG. 11b illustrates an example flow diagram of a method, according to another embodiment.

FIG. 11b illustrates a flow diagram of a method, according to another embodiment. In one embodiment, the method of FIG. 11b may be performed by a mobile device or UE, for example.

The method may include, at 250, sending a random access channel (RACH) preamble. The sending may include sending multiple copies of the RACH preamble at different time intervals where each time interval corresponds to an access point receiver beamforming with a Q-element antenna array employing a different beam from a set of B basis function beams. The method may further include, at 260, transmitting a feedback message comprising an indication of the best $M_B$ basis function beams plus a gain and phase value for each of the $M_B$ beams.

In some embodiments, the functionality of any of the methods described herein, such as those illustrated in FIGS. 8, 11a and 11b discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    receiving, at an access point employing a receiver with a plurality of antennas, a random access channel (RACH) preamble sent from a mobile unit,
    wherein the receiving comprises receiving a same RACH preamble at a plurality, $M_B$, of different time intervals where the access point beamforms with a different beam selected from B basis function beams at each of the plurality, $M_B$ of different time intervals,
    wherein the receiving comprises receiving the same RACH preamble at B different time intervals,
    wherein the B basis function beams are orthogonal,
    wherein the B different time intervals are equal to $M^2$ times, $M^2$ representing a total number of antennas in an M×M array,
    wherein the method further comprises listening to different orthogonal receive basis function beams, wherein each RACH transmission associated with each of a plurality of $M_B$ basis function beams comprises a weight value, wherein B represents a total number of times during which the access point listens on different orthogonal receive basis function beams, and wherein $M_B$ represents a subset of B.

2. The method according to claim 1, wherein the RACH preamble in a given time interval is multiplied at the mobile unit by a phase value associated with the basis function beam used to receive at said given time interval.

3. The method according to claim 1, further comprising sending pilot symbols by the access point from each of the B basis function beams at some time prior to a RACH interval.

4. The method according to claim 1, further comprising receiving, by the access point, a feedback message from the mobile unit, the feedback message comprising an indication of a plurality of best $M_B$ basis function beams plus a gain and phase value for each of a plurality of $M_B$ beams.

5. The method according to claim 1, wherein the B basis function beams comprise near-omni-directional beams.

6. The method according to claim 1, wherein there are two sets of a plurality of transmit antennas and RACH preambles are combined across the two sets of the plurality of transmit antennas.

7. An apparatus, comprising:
at least one processor; and
at least one memory including computer program code, the at least one memory and computer program code configured, with the at least one processor, to cause the apparatus at least to
receive a random access channel (RACH) preamble sent from a mobile unit,
wherein the apparatus is configured to receive a same RACH preamble at a plurality, $M_B$, of different time intervals where the apparatus beamforms with a different beam selected from B basis function beams at each of the plurality, $M_B$ of different time intervals,
wherein receiving the RACH preamble comprises receiving the same RACH preamble at B different time intervals,
wherein the B basis function beams are orthogonal,
wherein the B different time intervals are equal to $M^2$ times, $M^2$ representing a total number of antennas in an M×M array,
wherein the at least one memory and computer program code are further configured, with the at least one processor, to cause the apparatus at least to listen to different orthogonal receive basis function beams,
wherein each RACH transmission associated with each of a plurality of $M_B$ basis function beams comprises a weight value,
wherein B represents a total number of times during which the access point listens on different orthogonal receive basis function beams, and
wherein $M_B$ represents a subset of B.

8. The apparatus according to claim 7, wherein the apparatus comprises an access point employing a receiver with a plurality of antennas.

9. The apparatus according to claim 7, wherein the RACH preamble in a given time interval is multiplied at the mobile unit by a phase value associated with the basis function beam used to receive at said given time interval.

10. The apparatus according to claim 7, wherein the at least one memory and computer program code are further configured, with the at least one processor, to cause the apparatus at least to send pilot symbols from each of the B basis function beams at some time prior to a RACH interval.

11. The apparatus according to claim 7, wherein the at least one memory and computer program code are further configured, with the at least one processor, to cause the apparatus at least to receive a feedback message from the mobile unit, the feedback message comprising an indication of a plurality of best $M_B$ basis function beams plus a gain and phase value for each of a plurality of $M_B$ beams.

12. The apparatus according to claim 7, wherein the B basis function beams comprise near-omni-directional beams.

13. The apparatus according to claim 7, wherein there are two sets of a plurality of transmit antennas and RACH preambles are combined across the two sets of the plurality of transmit antennas.

14. A computer program, embodied on a non-transitory computer readable medium, the computer program configured to control a processor to perform a process, comprising:
receiving, at an access point employing a receiver with a plurality of antennas, a random access channel (RACH) preamble sent from a mobile unit,
wherein the receiving comprises receiving a same RACH preamble at a plurality, $M_B$, of different time intervals where the access point beamforms with a different beam selected from B basis function beams at each of the plurality, $M_B$ of different time intervals,
wherein the receiving comprises receiving the same RACH preamble at B different time intervals,
wherein the B basis function beams are orthogonal,
wherein the B different time intervals are equal to $M^2$ times, $M^2$ representing a total number of antennas in an M×M array,
wherein the computer program is further configured to control a processor to perform a process of listening to different orthogonal receive basis function beams,
wherein each RACH transmission associated with each of a plurality of $M_B$ basis function beams comprises a weight value,
wherein B represents a total number of times during which the access point listens on different orthogonal receive basis function beams, and
wherein $M_B$ represents a subset of B.

15. A method, comprising:
sending, by a mobile unit, a random access channel (RACH) preamble,
wherein the sending comprises sending multiple copies of a same RACH preamble at different time intervals where each time interval corresponds to an access point receiver beamforming with an antenna array employing a different beam from a set of B basis function beams,
wherein the sending comprises sending the same RACH preamble at B different time intervals,
wherein the B basis function beams are orthogonal,
wherein the B different time intervals are equal to $M^2$ times, $M^2$ representing a total number of antennas in an M×M array,
wherein the method further comprises applying a weight on each RACH transmission associated with each of a plurality of $M_B$ basis function beams,
wherein B represents a total number of times during which the access point listens on different orthogonal receive basis function beams, and
wherein $M_B$ represents a subset of B.

16. The method according to claim 15, wherein the RACH preamble in a given time interval is also multiplied by a phase value associated with the basis function beam used to receive at said given time interval.

17. The method according to claim 16, wherein the phase values are determined from pilot symbols sent by the access point from each of the B basis function beams at some time prior to a RACH interval.

18. The method according to claim 15, further comprising transmitting a feedback message comprising an indication of a plurality of best $M_B$ basis function beams plus a gain and phase value for each of a plurality of $M_B$ beams.

19. The method according to claim 15, wherein the B basis function beams comprise near-omni-directional beams.

20. An apparatus, comprising:
at least one processor; and
at least one memory including computer program code,
the at least one memory and computer program code configured, with the at least one processor, to cause the apparatus at least to
send a random access channel (RACH) preamble,
wherein the sending comprises sending multiple copies of a same RACH preamble at different time intervals where each time interval corresponds to an access point receiver beamforming with an antenna array employing a different beam from a set of B basis function beams,
wherein sending the RACH preamble comprises sending the same RACH preamble at B different time intervals,
wherein the B basis function beams are orthogonal,
wherein the B different time intervals are equal to $M^2$ times, $M^2$ representing a total number of antennas in an M×M array,
wherein the at least one memory and computer program code configured, with the at least one processor, to cause the apparatus at least to apply a weight on each RACH transmission associated with each of a plurality of $M_B$ basis function beams,
wherein B represents a total number of times during which the access point listens on different orthogonal receive basis function beams, and
wherein $M_B$ represents a subset of B.

21. The apparatus according to claim 20, wherein the apparatus comprises a mobile unit.

22. The apparatus according to claim 20, wherein the RACH preamble in a given time interval is also multiplied by a phase value associated with the basis function beam used to receive at said given time interval.

23. The apparatus according to claim 22, wherein the phase values are determined from pilot symbols sent by the access point from each of the B basis function beams at some time prior to a RACH interval.

24. The apparatus according to claim 20, wherein the at least one memory and computer program code are further configured, with the at least one processor, to cause the apparatus at least to transmit a feedback message comprising an indication of a plurality of best $M_B$ basis function beams plus a gain and phase value for each of a plurality of $M_B$ beams.

25. The apparatus according to claim 20, wherein the B basis function beams comprise near-omni-directional beams.

26. A computer program, embodied on a non-transitory computer readable medium, the computer program configured to control a processor to perform a process, comprising:
sending a random access channel (RACH) preamble,
wherein the sending comprises sending multiple copies of a same RACH preamble at different time intervals where each time interval corresponds to an access point receiver beamforming with an antenna array employing a different beam from a set of B basis function beams,
wherein the sending comprises sending the same RACH preamble at B different time intervals,
wherein the B basis function beams are orthogonal,
wherein the B different time intervals are equal to $M^2$ times, $M^2$ representing a total number of antennas in an M×M array,
wherein the process further comprises applying a weight on each RACH transmission associated with each of a plurality of $M_B$ basis function beams,
wherein B represents a total number of times during which the access point listens on different orthogonal receive basis function beams, and
wherein $M_B$ represents a subset of B.

* * * * *